Sept. 9, 1969  R. P. HOLLAND, JR  3,465,990
AIRCRAFT HAVING ENERGY-CONSERVING MEANS
Filed Oct. 5, 1966  3 Sheets-Sheet 1

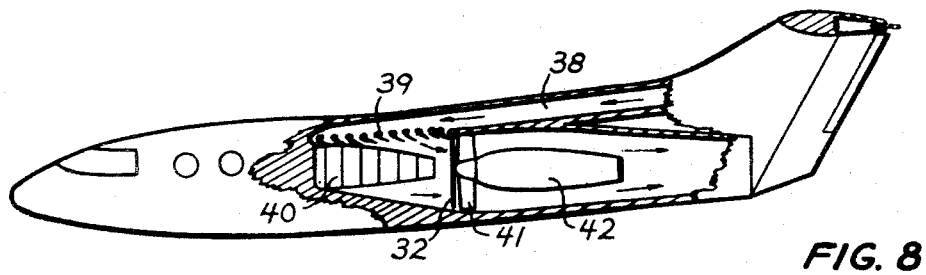
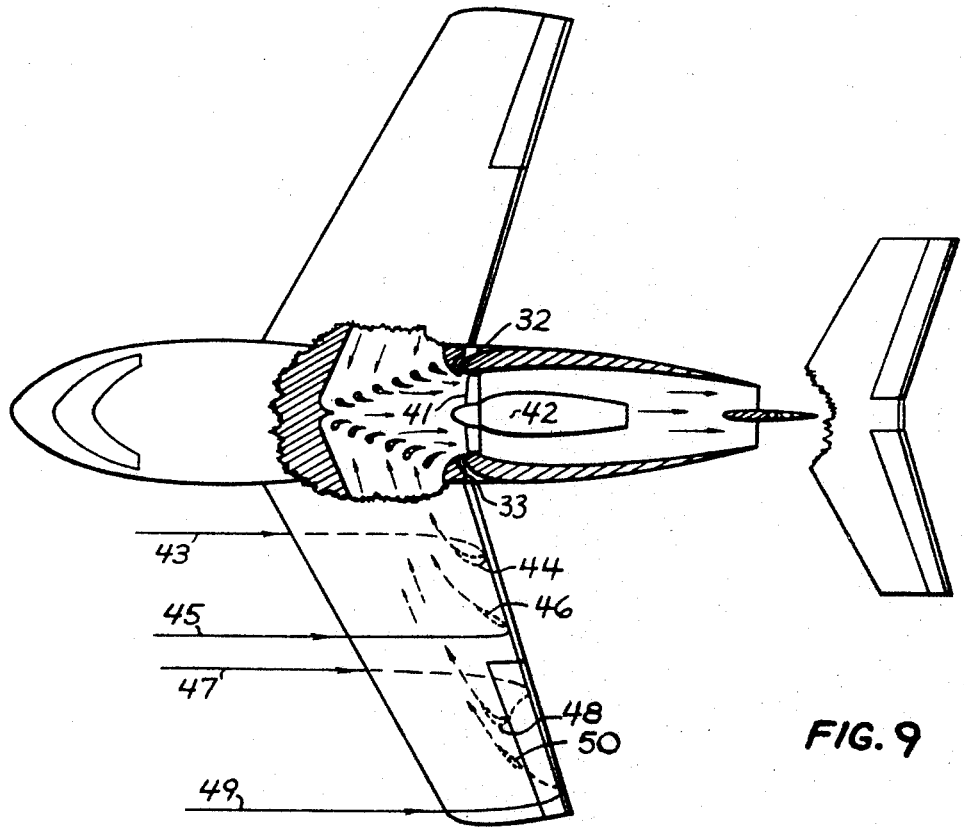

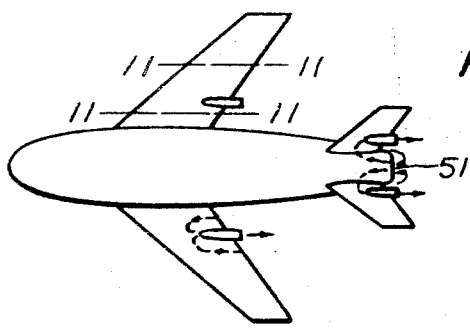
FIG. 10
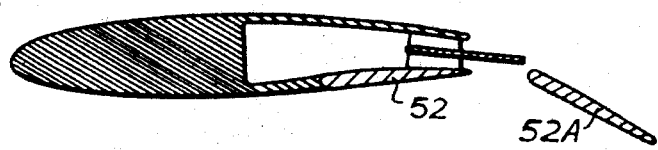
FIG. 11
FIG. 12
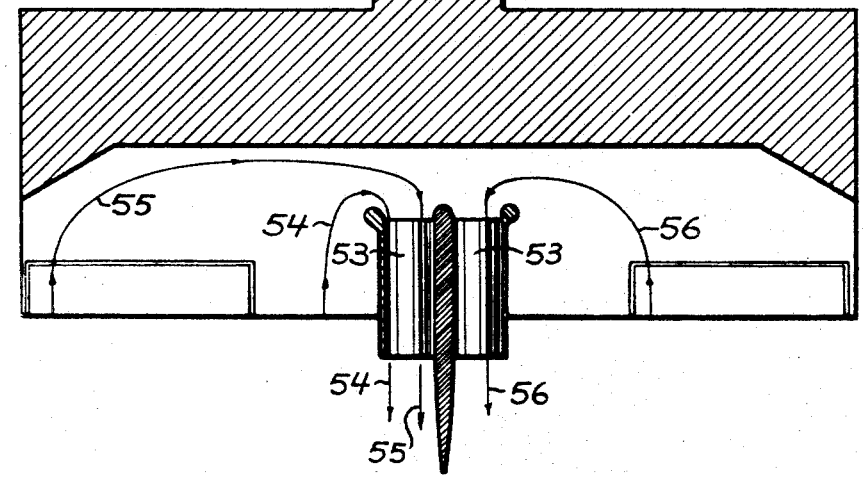
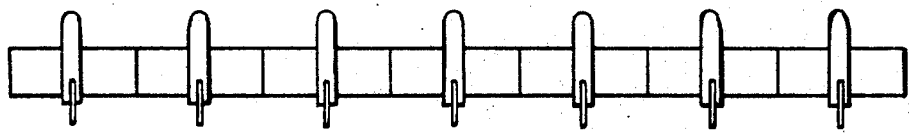
FIG. 13

United States Patent Office 3,465,990
Patented Sept. 9, 1969

3,465,990
AIRCRAFT HAVING ENERGY-CONSERVING MEANS
Raymond Prunty Holland, Jr., 1702 W. 3rd St., Roswell, N. Mex. 88201
Filed Oct. 5, 1966, Ser. No. 584,395
Int. Cl. B64d 27/20
U.S. Cl. 244—53
9 Claims

ABSTRACT OF THE DISCLOSURE

An airplane accomplishes very high speed-power-weight efficiency by capturing the viscous wake and using it for propulsion. Air admitted through distributed rear stagnation inlets is ducted internally, through a buried power-plant, reducing propulsive kinetic energy lost to the atmosphere, reducing engine power demands, and fuel consumption. Practical advantages include: light, deep, rigid structural forms with large internal volume; elimination of torque, of bird ingestion, of external parasite parts (even the propeller on low powered aircraft), and of the interference between the wing beam and the buried engine; and the reduction of noise. The invention is suited especially to airplanes of the air train types, U.S. Patent 3,249,322.

---

Figure 1:
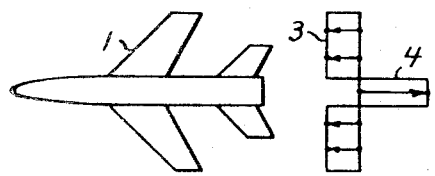

The present invention relates to improvements in the construction of air craft and has particular reference to an airplane having novel energy-conserving means. In this invention, propulsive air enters through a mouth near the rear of the structure where it would otherwise flow away downstream, thence passes internally to an internally mounted engine, and finally is expelled from the aircraft rearwardly for propulsion.

In the past, the improvement of propulsive efficiency on the one hand, and the reduction of aerodynamic drag on the other hand, have received much separate attention, but they have received little attention in their combined action. Even less attention has been paid in the past to these two in combination as they bear upon the designer's problems related to the configuration of the airplane.

It is an object of the present invention to increase propulsive efficiency, reduce drag, and improve airplane design configuration, by providing a single solution to these conflicting requirements.

It is a broad object of the invention to produce an airplane which has greater functional ability than has been possible heretofore and which is able to fly at a desired speed with the expenditure of relatively less power than has been possible.

It is an object of the invention to reduce the pressure drag, sometimes called the form drag, of the airplane, and to reduce the drag due to lateral components of velocity in the external flow across the wing, particularly near the free wing tips.

It is an object of the invention to increase relatively the critical Mach number of the wing of the airplane by the use of an airfoil section of generally elliptical form, without incurring the presure drag ordinarily existing with an elliptical airfoil section.

It is a broad object of the invention to reduce energy losses from aerodynamic causes and to improve functional ability and especially to do so on airplanes which are already very efficient aerodynamically, such as the air train, as discussed in my Patents 3,226,056 and 3,249,-322, so that a high degree of aerodyamic refinement and practical usefulness may be achieved by such airplanes.

Further specific objects are to produce improvements in airplane configuration, either separately or in combination, as follows:

To permit nearly all of the exposed surface area of the airplane to function efficiently as wing area, eliminating the parasite drag of fuselages, nacelles, horizontal tail surfaces, and propellers.

To permit the designer to use airplane cross sections in the direction of flow having unusually deep proportions, by employing means which eliminate the aeodynamic penalties otherwise occurring with such deep sections, thereby obtaining greater internal volume, greater structural strength and stiffness per unit of structural weight, and greater surface curvature, the latter reducing the difficulties of manufacturing smooth, wrinkle-free surfaces.

To permit the use of relatively deep wing sections, such as are useful on the air train for passenger walk ways through the wing from one unit of the train to the next, without incurring an increase of aerodynamic pressure drag.

To permit the use of propulsive streams of small cross sectional areas, by employing means which greatly reduce the aerodynamic losses otherwise occurring with small propulsive streams.

To permit the propulsive power plant to be submerged within the streamlined external aerodynamic contours of the aircraft.

To protect the power plant from the formation of ice, and to protect the aircraft from ice thrown off by rotating parts of the power plant.

To eliminate the exposed propeller, even from the lightest types of aircraft having the least power.

To simplify the aircraft power plant, obtaining the effects of a controllable pitch propeller without having any actual change of blade pitch.

To eliminate the torque reaction of the propeller on the aircraft, facilitating the piloting of the airplane, especially by beginners.

To produce a quiet aircraft, having engine and propulsive elements submerged, and producing very little sound in the propulsive reaction stream behind the aircraft.

To eliminate the danger of being struck accidentally by the propeller, especially as airplanes come into more popular and casual use.

To eliminate the necessity for the use of a long-legged landing gear as now needed to provide ground clearance for the propeller, and thereby to avoid the weight, cost, aerodynamic drag or retracting mechanism, and the ungainliness now common with propeller airplanes, especially with small airplanes intended for ownership by individuals.

To eliminate certain faults of submerged power plants as used heretofore. Such power plants take in air from the front of the wing, and have the following faults which are eliminated by this invention: (a) They interfere with the structural wing beam, with fuel tanks and with possible passenger cabins, all of which must be located well forward in the wing, and (b) they require an external opening in the leading edge of the wing causing structural, aerodynamic and weight penalties.

To make efficient use of the rearward portion of the wing, using available internal volume there which for aeroelastic or balance reasons, cannot bear much weight, but which is capable of bearing light weight ducting satisfactorily.

To permit the propulsive power plant to be located rearward of the occupants where it does not interfere with the forward view, does not cause excessive noise and vibration in the cabin, and where it does not impose fumes or heat on the occupants of the airplane.

To provide a rearward-facing air intake for the propulsive power plant which during flight will not be clogged nor permit entry to the engine, by ice, birds or other foreign objects.

To provide the various above-listed objects in selected combinations according to the purpose of the aircraft, to produce a compact aircraft, well arranged for functional utility, light weight, clean appearance, and high performance.

Figure 2:
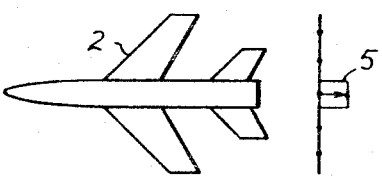
Figure 3:
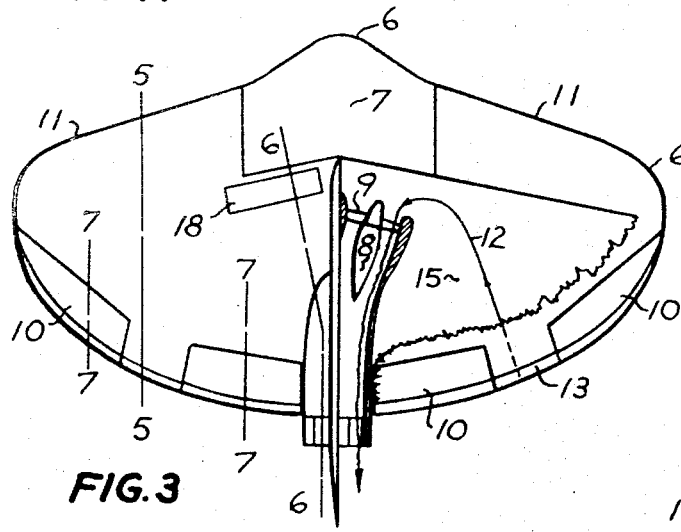
Figure 4:
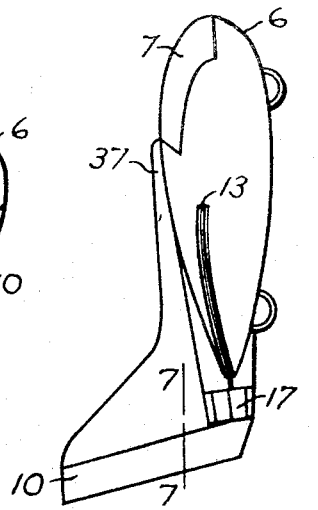
Figure 5:
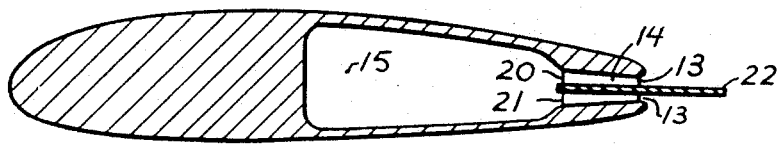
Figure 7:
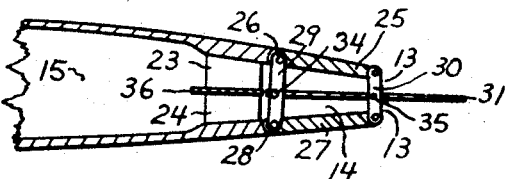
Figure 6:
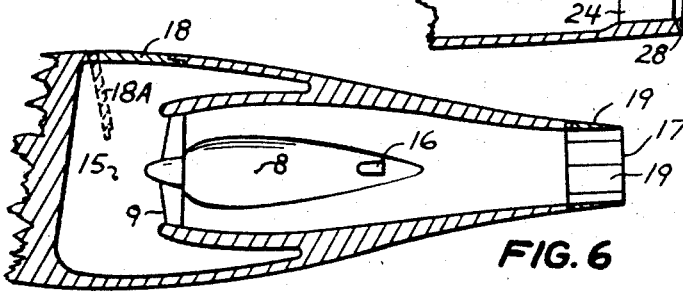

In the drawing, FIGURE 1 is a diagrammatic plan view illustrating the forwardly and rearwardly running streams of air which exist behind a conventional airplane, and FIGURE 2 shows the physical effect of this invention. It eliminates the forwardly-running stream of air and greatly reduced the velocity of the rearwardly-running stream, saving energy and power otherwise wasted. FIGURES 3 and 4 are a plan view and side view respectively of a small all-wing private owner airplane employing this invention. In FIGURE 3 a portion of the upper surface of the wing to the right of airplane center line and rearward of the wing beam is removed to show the internally installed power plant. FIGURE 5 is a profile cross section through the wing of the airplane in FIGURE 3 showing the construction of the wake-capturing inlet at the wing trailing edge and the internal ducting. FIGURE 6 is a section as indicated at line 6—6 on FIGURE 3 showing the internal power plant in more detail. FIGURE 7 is a section at lines 7—7 on FIGURES 3 and 4 showing the construction of the rearwardly-facing wake-capturing air inlet at an aerodynamic control surface.

FIGURES 8 and 9 are side view and top plan view respectively of the application of the invention to an executive transport airplane powered by an internally mounted turboshaft-propeller engine. Portions are broken away to show the internal arrangement of the submerged propulsion system. In FIGURE 9 on the left wing, streamlines are indicated showing the development of oppositely-running lateral flows at the trailing edge inlet, and internal cambered ribs are indicated which redirect this flow to recover its kinetic energy.

FIGURE 10 indicates the application of the invention to a large four engine jet transport having unusually large fuselage volume, with the wake being captured at an inlet at the trailing edge of each wing supplying air to a pair of wing-mounted engines, and at an inlet at the rearward extremity of the fuselage, supplying air to two engines mounted in the tail surfaces. FIGURE 11 is a profile section through the wing taken at 11—11 of FIGURE 10.

FIGURE 12 is a plan view of an airplane for air train use, with the top surface of the wing removed in its rearward portion and with streamlines indicated, showing the internal arrangement of ducts and engines. FIGURE 13 is a plan view of a seven-unit air train formed of units as shown in FIGURE 12.

In the present invention the airplane is sustained in powered flight by a primary thrust force produced by the reaction of rearwardly expelled air previously admitted to the interior of the airplane through intake mouths lying downstream from drag-producing external aerodynamic surfaces. These mouths capture a portion of, or all of the aerodynamic wake, consisting of air which has been retarded by shearing forces acting against the progress of the air as it rubs rearwardly along the aerodynamic surfaces. Capture is accomplished near the rear extremity of the aerodynamic surface. The accomplished act of wake-capture causes a strong rear stagnation ram pressure to occur which eliminates pressure drag and which makes possible the continuing capture of the wake with a minimum expenditure of energy. The captured air is ducted from the intake mouths to an engine which restores its total pressure head to that of the ambient stream, plus an increase as required for propulsion, and releases it rearwardly to the atmosphere to produce forward thrust.

Prior to this invention the art of aircraft propulsion has taught that the propulsive stream should be admitted, as with the conventional jet engine, at the front of a body, not at the rear of a body. It has been clear that an open mouth at the front of a body can receive air at its full dynamic pressure head, with benefits to the power cycle of the engine. But heretofore it has not been at all obvious that these same power cycle benefits may be realized when air is admitted at the rear, nor has it been obvious that substantial improvements in the overall utility and performance of an aircraft (not merely the power cycle) are accomplished when air is admitted from the rear in the manner described herein.

To understand these benefits, one must understand the well established aerodynamic fact that if air had no viscosity, the ram pressure at the rear stagnation point of an aerodynamic body would be as strong as the ram pressure at the front of the body, in subsonic flow. Further, one must understand that when all the air which rubs close to the body has been captured, the other layers of air farther from the body behave as if viscosity were absent. As a result, if the wake were captured completely, it would make no difference so far as pressures are concerned whether the air were flowing from front to rear or from rear to front; the maximum static pressures would be the same both ways, and air would enter an inlet as effectively from the rear as from the front.

To start the capture of the wake a suction is applied at the rearwardly located inlet, and a seemingly paradoxical effect occurs. A co-operating pressure is obtained. Now more air enters than would enter without suction, and as more air enters, greater pressure is generated, and still more air enters. To the same degree that the wake is captured in this way, the rear stagnation pressure increases, until the pressure becomes as great as that at the front stagnation point and the rear inlet becomes as effective as a nose inlet.

When air previously admitted to the interior of the aircraft is released again into the rearwardly flowing free stream, it must have more rearwardly directed momentum than it had before it encountered the aircraft, if it is to produce a thrust force. Therefore, the air admitted near the rear stagnation point is ducted to an internal engine which restores the energy lost to friction in rubbing across the external aerodynamic surfaces, and lost in passing through the internal ducting, and adds additional energy as necessary to overcome induced drag, or to cause the airplane to climb or to accelerate.

By means of this process of capturing the aerodynamic wake, re-energizing it and expelling it for primary propulsion, a saving of energy is accomplished in two important ways. (1) The pressure drag of the aerodynamic parts is reduced. (2) The energy lost in the propulsive stream is reduced.

(1) Reduction of pressure drag

Presssure drag is the drag force exerted on the body by pressures acting perpendicular to the external surface, as contrasted to skin friction drag which is the drag force due to shearing forces acting tangentially to the surface. Skin friction causes air to be retarded along the surfaces. This alters the effective aerodynamic form of the body. Forward acting pressures at the rear of the body become somewhat reduced and a rearward-acting net pressure, the pressure drag, is produced.

Pressure drag occurs on all streamlined aerodynamic forms; it is least on those forms which are flattest along the direction of flow and is greatest on those forms which are most deeply curved. A very thin flat plate edgewise has no pressure drag. The drag of a sphere is about 95% pressure drag. Accurate measurements of skin friction drag on a symmetrical airfoil 12% thick at zero lift show that 80% of the total drag is due to skin friction. The remaining 20% is pressure drag. Ref. Albert E. von Doenhoff, NACA Advance Confidential Report, August 1940, Wartime Report L–507. When an airfoil section is thicker than 12% or when its surface is less than ideally smooth, or when the wing is at an angle of attack, more than 20% of the airfoil section drag is pressure drag. This drag if reduced in degree as the wake is drawn into the wing; it is eliminated by this invention when the wake is fully captured.

Power is required to capture the wake, and there are internal losses due to ducting the wake through the aircraft, but these losses are small compared to the losses which are avoided.

In the wake at the trailing edge of a lifting wing, particularly near the free wing tips, there are lateral flows. Just above the trailing edge the flow inclines inboard and just below the trailing edge the flow inclines outboard, toward the free tip. These flows represent energy which is ordinarily lost. The drag so produced is a portion of the drag ordinarily changed to induced drag.

In this invention, a thin plate is used at the wake-capturing mouth to separate these two counter-flowing regions and properly aligned cambered vanes standing perpendicular to the plate are used above and below the plate to turn these lateral flows into the wing. In that way energy is recovered which would otherwise be lost.

Similarly, energy losses due to irregularities of the wing surface texture are recovered.

Surface roughness on practical wings and fuselages causes a relatively great increase of pressure drab. By capturing the wakes behind such bodies, thereby eliminating the pressure drag, relatively rougher surface construction may be used with relatively smaller drag penalties.

(2) Reduction of energy lost in the propulsive stream

In an airplane not using this invention, the passage of the airplane past a point in the atmosphere causes a stream of air to run forward. This is the wake, or the forward wash. The power absorbed in generating this disturbance is the same power required (in a subsonic airplane) to overcome the non-induced drag of the plane.

To obtain a thrust reaction on the plane, another stream of air must be generated running rearwardly relative to a point at rest in the atmosphere. This is the slipstream or the rearward wash. For the thrust so developed to be equal to the non-induced drag, the momentum generated per unit of time in the rearward-running stream must be equal to the momentum generated per unit of time in the forward-running stream. Both of these streams absorb energy which must be supplied by the engine. If the forward-running stream can be reduced, the rearward-running stream may be correspondingly reduced, and a direct saving of energy is thereby achieved.

The present invention can eliminate the forward-running stream and can thereby eliminate the rearward-running stream which is necessary to balance it, saving the energy otherwise lost to both streams.

There is still induced drag; a rearward-running stream is still required to balance this. But in an aircraft of the type of the air train (U.S. Patents 3,226,056 and 3,249,322) in subsonic flight, the induced drag can be reduced close to the vanishing point. When an air train uses this invention, the wake is captured, the forward-running disturbance in the atmosphere is eliminated, and the need for a rearward-running propulsive stream is also practically eliminated. The plane then passes through the atmosphere with barely a disturbance. All three of the energy-absorbing disturbances which are ordinarily imposed on atmosphere by the passage of an airplane have been reduced close to the zero point. These three are (1) the downwash (reduced by the long span of the air train), (2) the forward wash (reduced by capturing the wake), and (3) the rearward wash (reduced because the other two reduce the magnitude of the required propulsive thrust).

Energy is still required from the engines, but almost solely to capture the wake, duct it to the engines, and restore to it the energy which was lost from it in rubbing across the external surfaces of the aircraft.

It is to be understood that when an aircraft is not an air train, or when less than the entire wake is captured, or when the airplane is climbing or increasing speed, correspondingly greater energy will be lost in the rearward propulsive wash, but even in these cases major savings of energy are accomplished by this invention.

Compact jet-type propulsive systems have heretofore been so uneconomical in slow-flying aircraft as to prevent their general adoption in practice. The present invention reduces the energy losses in these propulsive jets to such a degree that they may be used, with many advantages in the design and operation of low-powered aircraft, as will be evident from the drawing. Similarly, in aircraft of higher powers and speeds, this invention eliminates much of the presently existing performance disadvantage of the pure turbojet engine as compared to the by-pass turbojet, or turbo-fan. Consequently, the simpler, smaller, lighter turbojet may be used effectively instead of the turbo-fan.

Referring now particularly to the drawing, airplane 1 in FIGURE 1 does not employ the invention, whereas airplane 2 in FIGURE 2 does employ the invention. Both airplanes are considered to be moving forward, to the left in the figures, at constant speed. Air lying in the plane of the wing, air which was motionless relative to the atmosphere before the arrival of airplane 1, is given a velocity forward relative to the atmosphere as airplane 1 passes, as indicated by forward wash 3. The velocity of 3 is smaller than the velocity of the airplane; wash 3 runs rearward relative to airplane 1. To propel airplane 1 forwardly despite the air which it continuously entrains and accelerates forwardly (as represented by 3), it is necessary to impart rearward velocity to the propulsive stream, or rearward wash 4. The momentum imparted each second to rearward wash 4 must exceed the momentum imparted to forward wash 3 by an amount sufficient to overcome all other sources of drag such as shock drag or induced drag. The relative velocities of washes 3 and 4, as measured from a point in fixed position relative to the atmosphere, are indicated by the lengths of the arrows.

In FIGURE 2, because of the action of the invention, there is no forward wash corresponding to wash 3. Air lying behind the wing of airplane 2 acquires no forward velocity. In subsonic flight (under which conditions shock drag is absent) propulsive wash 5 need only have sufficient rearward velocity to provide the reaction force necessary to overcome induced drag. When the airplane is an air train, which has very small induced drag, the velocity of wash 5 becomes nearly zero, so that virtually no disturbance occurs in the atmosphere when the air train passes.

The difference of velocity of washes 4 and 5 corresponds to a difference of energy imparted to the atmosphere by the propulsive streams of the two passing airplanes. This difference of power must be supplied by the engines of the two planes. The power output of the engine of airplane 2 employing the invention may be considerably smaller than that of airplane 1, for flight at the same speed, and airplane 2 has correspondingly greater range and endurance, and when it uses equal power it has greater speed and rate of climb.

Airplane 6 in FIGURES 3 through 7 is a preferred embodiment of the invention. It is an all-wing twin-engine low powered private owner airplane having relatively light wing loading, satisfying most of the above-stated objects of the invention. The direction of flight in FIGURES 3 and 3 is toward the top of page. Passenger cabin 7 is located forward of engines 8, which are fully submerged within the aerodynamic contours of the airplane. There are no external propellers. Propeller 9 is a fixed pitch propeller turned at relatively high r.p.m. by direct shaft drive from engine 8. (The right engine and propeller are shown; the construction is symmetrical on the left side, throughout.) Control surfaces 10 control the flight of the airplane in a conventional manner. Those located inboard on FIGURE 3 operate as elevators, and those located outboard operate as ailerons. The control surface on FIGURE 4 is the rudder. The entire planview surface in FIGURE 3, including cabin 7, functions as wing area.

Wing leading edge 11 extends from wing tip to wing tip along the outline of the planview across the front of cabin 7.

FIGURE 4 shows the side view form of the passenger cabin blending smoothly into the wing in the form of a deep airfoil section. The efficient use of such an airfoil section is made possible by this invention by the elimination of pressure drag whenever engines 8 are thrusting and the aircraft is flying at cruising speed or faster.

In the operation of the invention, in flight, the primary propulsive air stream, that stream which provides the propulsion to maintain the airplane in flight, is represented by typical streamline 12. It enters inlets 13, moves forward through diffusers 14, into internal duct 15, with the flow unimpeded by internal structure and expanding gradually, guided by smooth internal surfaces as it moves toward propeller 9. A portion of this air, used for combustion in engine 8, issues from rearward facing engine exhaust stack 16 driving the air toward nozzle 17, in support of the action of propeller 9, which also drives the air rearward and out of nozzle 17, producing the thrust needed to maintain flight. The same engines which draw the air into the wing drive it out for propulsion, and no other engines need be employed on the airplane to sustain flight.

In this invention "primary propulsive means" are defined as those means which, without the supplementary aid of any other powered means provide sufficient thrust to maintain the aircraft in sustained powered flight. The primary propulsive stream is defined as the airstream which is acted upon by the primary propulsive means. It is represented by streamline 12. Flow along streamline 12, and along other streamlines of which streamline 12 is typical, including the powered actions of propeller 9 and/or exhaust stack 16, represents an example of primary propulsive means. The other aircraft configurations, in the other figures, also show primary propulsive means. In no case does any of these configurations include another engine, operating conventionally, which is necessary to maintain sustained flight.

During take-off and whenever airplane 6 accelerates at slow flight speeds air is admitted at flaps 18, shown in FIGURES 3 and 6. Flap 18 is hinged at its forward edge and is lightly spring loaded to return to its upward closed position. However, when the static pressure drops sufficiently in duct 15 just forward of propeller 9, flap 18 opens automatically as shown at 18A in FIG. 6, admitting air directly into duct 15 for rearward expulsion by propeller 15. This is desirable to permit engines 8 to develop full power for take-off and for acceleration and climb at slow flight speeds, and it also serves to prevent the development of a crushing load due to atmospheric pressure on the upper and lower surfaces of duct 15. Once forward speed develops, flaps 18 close automatically because ram pressure develops at inlets 13 which is communicated into duct 15, and reduced pressure develops on the external upper surface of the airplane. In other words, pressure-responsive flap 18 responds to internal pressures in duct 15 generated by the forward speed of the aircraft, acting through rear inlet 13; these pressures cause flap 18 (at the auxiliary variable area inlet) to move from the open inlet position 18A to the closed position 18. See FIGURE 6. At that time, the entire hollow interior of the airplane along streamlines like 12 experiences pressure greater than that of the atmosphere.

It is apparent, of course, that the size of inlets 13 may be designed to admit a smaller or larger amount of air according to the thickness of the wing, according to the needs of the engine and propeller, and according to whether the entire wing wake is to be captured or only a part of its is to be captured, or according to whether air in excess of the wing wake is to be captured. These proportions are not sensitive. They are matters of design which can be decided by competent engineers, and which can be accommodated if so desired by the use of adjustable inlet areas at inlets 13, by any of numerous means.

It is to be observed that if less than the entire wing wake is admitted the portion which is admitted is that portion which has rubbed closest to the wing surface where the most energy has been lost, and therefore the major portion of the benefit of the invention is obtained. Also, if more air is admitted than that necessary to capture the entire wake, such additional air is admitted at full ram pressure, so that no adverse effects are produced.

It is also apparent that in some designs, the flow velocity in duct 15 may be made sufficiently small that an open truss structure may be used in the duct, with members suitably shaped in cross-sectional form for low drag.

The naturally existing forms of diffuser 14 and duct 15 are such that there is a gradual growth of duct cross sectional area from inlets 13 to the region of propellers 9, caused by the taper of the wing rearward to a thin, trailing edge and spanwise toward a relatively thin wing tip. For many designs openings 13 at the trailing edge may be inconspicuous; they achieve adequate inlet area because they extend along the entire wing trailing edge.

It is obvious that, with such long slits serving as inlets, facing rearwardly, foreign objects such as birds cannot fly into the opening, and that the risk of anything being able to block the opening completely can be made very small. Such a long slender opening also permits airfoils to be used with only moderate modifications of form at their trailing edges.

Outlet flaps 19 arranged circumferentially around nozzle 17 each hinged at its forward edge and controlled by well known means, adjust the exit area of nozzle 17, and in that way control the mass flow rate of air through the internal propulsive system. By means of adjustable outlet flaps 19, the velocity of flow through propeller 9 can be controlled to be proportional to the r.p.m. of propeller 19, at a rate corresponding to the peak efficiency of propeller 19. Alternatively, outlet flaps 17 may be used to control the r.p.m. of propeller 9 at constant engine control settings, just as a controllable pitch propeller may be used on a conventional airplane to control engine r.p.m. Consequently, propeller 19 may be of simple riggid one-piece design and yet achieve blade efficiencies equivalent to those attained with a propeller permitting changes of blade angle.

Upper rib plate 20 and lower rib plate 21 stand vertically between the upper and lower surfaces of diffuser 14, aligned generally fore and aft. They serve as structural shear members and as guide vanes guiding the flow with respect to lateral position and direction through diffuser 14. When lateral velocities exist in the flow at inlets 13, plates 20 and 21 turn the flow so that it enters duct 15 with minimum loss of pressure. Upper plate 20 will ordinarily have different alignment and camber from lower plate 21, because lateral flow inboard will occur at the rear edge of upper plate 20, whereas lateral flow outboard will occur at the rear edge of lower plate 21. These lateral flows are particularly strong near the wing tips.

Stagnation plate 22 lies generally horizontally between plates 20 and 21, serving as a median line splitter vane in diffuser 14, and extending rearward of inlets 13, where it serves as an aerodynamic trailing edge and as a stagnation plate. Plate 22 separates the two lateral flow regions described above, the inwardly flowing region lying above plate 22 and the outwardly flowing region lying below plate 22. When engine 8 and propeller 9 are operating so that flow is entering inlets 13, the rearwardly flowing external flow along the rearmost surface of the wing bends downwardly from the upper wing surface and upwardly from the lower wing surface, across the rearward edges of these wing surfaces toward plate 22. The rearward edges of these wing surfaces, both upper and lower, above and below plate 22, are shaped to permit flow to turn and run forwardly into inlet mouth 13, with energy losses at a minimum in this action. For this purpose, these rear edges, serving as inlet lips, are of thickened and rounded form as compared to simple edges of flat sheet material. See FIGURE 5. The part of the flow closest to the wing surface completes the turn around the rounded inlet lips and runs forward into inlet 13. The rest of the flow close to the wing turns toward plate 22 and then continues rearward. These two flows divide against plate 22. One streamline strikes plate 22 perpendicularly, forming an aerodynamic stagnation point, giving plate 22 its name of "stagnation plate." When the wing wake is fully captured the ram static pressure at the stagnation point on plate 22 is as great as may be achieved at any point on the airplane. Stagnation plate 22 stabilizes the position of the rearward stagnation point; in its absence the stagnation point would jump back and forth between the upper and lower lips at inlet 13, imposing fluctuating forces on the wing. Plate 22 also provides a guiding surface for the rearward flow-off aft of the stagnation point. It serves in a similar function when engine 8 is not operating; there is no stagnation point on plate 22 at that time, but its function as an aerodynamic trailing edge still applies.

Still another function of plate 22 is to control relatively the amount of air drawn into the propulsive system from above the wing as against the amount of air drawn in from beneath the wing, as may be desired for a particular design flight condition. These results are accomplished by selecting the relative sizes of inlets 13 above and below plate 22, and by selecting a particular angular position of the protruding rearmost portion of plate 22 relative to the chord plane of the wing.

The construction of the trailing edge air inlet when also functioning as a control surface is shown in FIGURE 7. Rib plates 23 and 24 fastened rigidly in the forward end of diffuser 14 serve functions the same as rib plates 20 and 21, described above. Upper control surface panel 25 is hinged to the main structure of the wing at hinge 26, and lower control surface panel 27 is similarly hinged at hinge 28. Forward link 29 lies between hinges 26 and 28, and the top of rearward link 30 is hinged to upper control surface panel 25 at its trailing edge, and the bottom of rearward link 30 is hinged to lower control surface panel 27 at its trailing edge. Plate 31, which combines the functions of control surface trailing edge and stagnation plate is hinged to forward link 29 near its midpoint and to rearward link 30, also near its midpoint in a similar manner, at hinge points 34 and 35, respectively. Conventional means, not shown, rotate panels 25 and 26 and plate 31, together, around hinges 26, 28 and 34, respectively, producing a combined result like that of a simple hinged trailing edge control surface.

Plate 36, rigidly attached between rib plates 23 and 24, lies forward of stagnation plate 31, serving with plate 31 as a splitter vane in diffuser 14.

The construction shown in FIGURE 7 applies at all the control surfaces of airplane 6, including the rudder as shown on FIGURE 4. Air captured at the trailing edge of the rudder is ducted internally through the vertical fin and dorsal fin to the region of duct 15 just forward of propellers 9. Fairing 37, visible in FIGURE 4, covers this duct.

In the power off flight condition rearwardly protruding plates 22 and 31 guide the direction of flow-off from the trailing edge and control the circulation around the aerodynamic surfaces lying upstream. In such a flight condition, the drag of airplane 6 is relatively large but is not excessive for practical gliding flight.

Airplane 6 is efficient, compact, light, and aerodynamically clean. It has a short landing gear, and permits access to the passenger cabin without interference of any sort with the power plant, without even passing near sucking ducts leading to the engines. External propellers, noise and other inconveniences have been removed. The occupants have the best possible view. The propulsive stream issuing from nozzles 17 exerts little or no torque, simplifying piloting. These and other obvious practical and functional advantages are made possible by this invention.

The performance of airplane 6 would be impressive, if it could be built in the form shown, even without the internally ducted drag-reducing propulsion system. Clearly it could not be built in this form without the aid of this invention. Nevertheless, for comparison, an airplane may be assumed having the same weight, the same propulsive nozzles 17, and the same aerodynamic form except that the trailing edges would be conventional. Computations show that such an airplane would require 50% more engine power to maintain the same speed in cruising flight as compared to airplane 6.

In the actual case, comparing conventional design against airplane 6, each airplane being capable of carrying the same number of passengers at the same speed, with the same range and fuel reserves, the power requirements for the conventional airplane would be about three times as great as the airplane incorporating this invention.

It is evident that this invention may be applied advantageously to other forms of airplanes. It provides effective means for auxiliary power for a soaring sailplane, without causing serious design compromises or even appreciably altering the external form of the sailplane. The power requirements for such an airplane are very small and the wing span is relatively long so that the modification of the wing at the trailing edge is very slight when providing ample inlet area. Also there is ample space already available for a very small engine behind the occupants, typically locating an exhaust nozzle beneath the tail boom near the wing root.

FIGURES 8 and 9 show the application of the invention to a high speed private owner or executive airplane, having a turbo-shaft engine mounted in the fuselage, driving a controllable pitch propeller. It is clear that the same general arrangement could be used with a turbo-jet or turbo-fan engine replacing the turbo-shaft engine. In FIGURE 8, which is a side view, a portion has been broken away to show the internal construction, including duct 38 running forward from the tail surfaces, turning vanes 39 and 40, high r.p.m. controllable pitch propeller 41, and turboshaft engine 42.

In FIGURE 9, in addition, rib plates are shown serving as turning vanes, guiding the induced lateral counterflows into the interior of the wing and directing them toward the wing root. Streamline 43 passes beneath the wing, rubbing along its lower surface, and turns outboard toward the wing tip as it approaches the trailing edge. It is drawn into the rear inlet and is turned inboard by rib plate 44. Streamline 45 passes above the wing, turns inboard and is guided into the wing by rib plate 46. Rib plate 44 has greater camber than rib plate 46, because of the greater angle through which it must turn the flow. Rib plates 44 and 46 are separated by a horizontal plate, functioning like stagnation plate 22 shown in FIGURE 5. Closer to the wing tip the streamlines diverge more widely. Streamline 47 is guided by rib plate 48, and streamline 49 is guided by rib plate 50 in a construction similar to that shown in FIGURE 7. Only four rib plates are shown in FIGURE 9, for clarity. Actually, a continuous double-deck cascade of such plates would be used, with plates like 44 and 48 in the bottom layer and 46 and 50 in the top layer, these layers being separated by horizontal plates like 22 and 36 in FIGURES 5 and 7, respectively.

The invention may be used to collect retarded air from a fuselage. FIGURE 9 shows inlets 32 delivering air from outside the fuselage to a narrow rearward-facing slit just forward of propeller 41. Rounded lip 33, which lies on the upstream side of inlet 32, assists the outside flow in making the turn into inlet 32, and in so doing causes a stagnation point to form on the downstream lip of inlet 32, helping to drive the air into the inlet.

FIGURE 10 shows a large four-engine transport airplane having an unusually large fuselage. Two engines are mounted in the wings operating on wing wake collected along the wing trailing edge. Two more engines are mounted in the tail surfaces and operate on fuselage wake collected through rear inlets as indicated, thereby eliminating the form drag of the fuselage which otherwise would be large.

FIGURE 11 shows an alternative construction of auxiliary air admittance flap, serving the same function as flap 18 in FIGURES 3 and 6 and serving also to increase the wing lift coefficient in the manner of a Fowler flap. Flap 52 occupies the position shown at 52A for take-off and landing, and takes the aerodynamically clean position shown at 52 during cruising flight, moving between these positions on conventional curved tracks, not shown. In the take-off position a large opening is produced at the lower contour of the wing permitting an ample supply of air to the wing engines; when flap 52 is retracted the invention operates producing reduced energy losses as described above. An open truss-work, not shown, is located across the gap just above the retracted flap, to complete the wing box structure.

It is obvious that other types of high lift flaps could be used in a manner similar to that in which the Fowler flap is used, as described above.

On an aircraft such as that represented in FIGURES 10 and 11, the need for an engine having a large-by-pass ratio is largely eliminated, the wasted energy in the propulsive jet having been reduced to a low level by means considerably more effective than by an increase of the by-pass ratio. Consequently the aircraft may be made clean, light, compact, free from problems of power plant interference with practical uses, in a manner similar to that for aircraft 6, described above.

The airfoil section shown in FIGURE 11 is a slightly cambered ellipse, modified at its trailing edge to provide air inlets. An airfoil of this form has a higher critical speed than a conventional airfoil which tapers to a thin trailing edge, and the wake collection feature of this invention eliminates the disadvantage which the blunt-tailed elliptical section would otherwise have, namely a high value of pressure drag.

Particular advantages of the invention are obtained when the invention is used on aircraft designed to be units of an air train. FIGURE 12 shows how space conflicts are solved in such an air train unit. In such an airplane the entire leading edge and forward fuselage volume plus some additional volume farther aft near the wing tips is needed for passengers, walkways from wing tip to wing tip for inter-unit transfer during flight, for wing spars, for docking mechanisms, for fuel transfer equipment, and for similar purposes. Much of this volume must be pressurized. In the most effective design there is no room forward for engines or inlet ducts to carry propulsion air to the engines. In the all-wing design as shown in FIGURE 12, which is desirable for greatest economy, the installation of engines in external positions above or below the wing is awkward at best. This invention solves these problems by permitting the engines and all their related parts to be installed rearwardly in the wing, while at the same time increasing propulsive efficiency and reducing that remaining drag which the air train itself cannot reduce.

FIGURE 12 is a plan view cross section of an air train unit embodying this invention. The cross hatched area in the forward region of that figure represents the volume from which all engine, engine air induction, and propulsive elements must be excluded because of the conflicting space problems described above. Two engines 53 are shown near the aircraft center line, and typical streamlines 54, 55, and 56 are shown entering at the wing trailing edge and issuing as propulsive exhaust behind the airplane.

FIGURE 13 shows an air train consisting of seven units like that shown in FIGURE 12. An air train embodying this invention would have a flight efficiency far beyond that of any other aircraft now contemplated.

I claim:

1. An airplane comprising substantial aerodynamically exposed external surface area and primary propulsion means, said primary propulsion means comprising air inlet means lying in the external surface of said airplane, air ducting means attached to said air inlet means, airplane-propelling powered air propulsion means attached within said ducting means, and air outlet means attached to said ducting means, said inlet means being situated rearward of substantial external surface area and laterally across a substantial portion of the span of said airplane, said air inlet means comprising mouth means lying along the trailing edge of airfoil means on said airplane, said mouth means comprising stagnation plate means lying lengthwise in said mouth means dividing said mouth means into two passages, each passage being adjacent to one of the two opposite surfaces of said airfoil means, the primary propulsive stream of said airplane consisting of air passing successively as follows: immediately adjacent to and rearwardly across said substantial aerodynamically exposed external surface area, in through said inlet means, through said air duct means and through said air propulsion means, and out through said outlet means, said primary propulsive stream sustaining said airplane in flight, as described.

2. In claim 1, said stagnation plate means protruding rearwardly out of said mouth means.

3. In claim 1, said ducting means comprising flow-guiding rib means attached to opposite internal surfaces of said ducting means and to opposite surfaces of said stagnation plate means, whereby kinetic energy contained in air streams running in opposite directions along the trailing edge of said airfoil means is recovered, as described.

4. In claim 1, said mouth means comprising hinged rudder-like aerodynamic control surface means.

5. In claim 1, said inlet means comprising variable area inlet means.

6. In claim 1, said outlet means comprising variable area exhaust nozzle means.

7. In claim 5, said variable area inlet means comprising means responsive to pressures generated by flight speed actuating said variable area inlet means.

8. In claim 1, flow turning vanes mounted in said passage.

9. In claim 8, flow turning vanes mounted in both of said passages, the flow turning vanes in the passage adjacent to the lower surface of said airfoil means having generally greater camber than the flow turning vanes in the passage adjacent to the upper surface of said airfoil means.

References Cited

UNITED STATES PATENTS

| | | |
|---|---|---|
| 2,406,923 | 9/1946 | Stalker. |
| 2,568,813 | 9/1951 | Lundberg _____ 244—52 X |
| 2,604,277 | 7/1952 | Anxionnaz _____ 244—15 |
| 2,869,805 | 1/1959 | Marshall _____ 244—130 X |
| 2,890,843 | 6/1959 | Attinello. |
| 3,012,740 | 12/1961 | Wagner. |
| 3,093,349 | 6/1963 | Wagner. |
| 3,226,056 | 12/1965 | Holland _____ 244—2 |
| 3,265,331 | 8/1966 | Miles. |

FOREIGN PATENTS

| | | |
|---|---|---|
| 966,522 | 8/1964 | Great Britain. |
| 1,018,609 | 1/1966 | Great Britain. |

MILTON BUCHLER, Primary Examiner

JAMES E. PITTENGER, Assistant Examiner

U.S. Cl. X.R.

244—42, 130